UNITED STATES PATENT OFFICE 2,240,191

PROCESS OF PRODUCING POROUS CONCRETE

Ralph H. McKee, New York, N. Y.

No Drawing. Application June 22, 1939,
Serial No. 280,516

11 Claims. (Cl. 106—24)

The present invention relates to a process of producing porous concrete, and, more particularly, to a novel and improved process of producing porous concrete, and to the product of such process.

Heretofore, various processes have been proposed and used for the production of porous and low gravity concrete. Thus, low gravity concrete has been made by incorporating cinders, vermiculite, burnt clay, blast furnace slag, and other light weight aggregate into the cement mix. None of these additions has provided a low gravity concrete which was fully satisfactory.

It has also been suggested that aluminum powder be mixed with the cement, sand, and, if desired, with gravel, subsequently adding water to the finished mixture. In this process hydrogen bubbles are formed by the action of the metallic aluminum on the aqueous solution of the alkali of the cement, thus producing a porous concrete containing voids filled with hydrogen.

Various disadvantages are connected with the application of this conventional porous concrete. Thus, first of all, aluminum reacts slowly with the alkali of the cement and with many types of cement requires the addition of caustic soda or other alkaline agents to supplement the alkali normally present in the cement. The speed of the reaction is greatly subject to variations in accordance with the temperature, as the reaction is much more rapid with warm water than with cold. As the temperature of water employed in the art of building construction is greatly subject to variations and seasonal changes, this, of course, makes it difficult to obtain the preferred reaction speeds and uniform porosity. For these and other reasons the product is not always uniform in character, and this is particularly so in porous concrete structures exceeding 8 inches in depth, since, when poured to a greater depth, the lower part of the structure is much denser than the upper part. Of course, these and other disadvantages have greatly handicapped the practical applications of porous concrete, although various modifications of the use of aluminum powder have been proposed in which clay, bentonite, and a higher pH have been suggested. Other processes, in which a froth-forming agent is to be stirred into the mixture or in which glue, Irish moss, silica gel, or other materials to give a gel-like structure have been proposed, do not provide any better solution of the outstanding problem and have never been used to any substantial extent.

Another proposal involves the incorporation of various gases including chlorine gas both to form cells and to react with the lime of the cement to produce calcium chloride and thereby promote hardening of the cement; oxygen gas, carbon dioxide gas, and also ammonia gas to form bubbles and cells directly, or to react with a hypochlorite to produce nitrogen gas. This proposal has always provided for ammonia in the form of a solution, hydrogen peroxide as a solution, and has also suggested the use of a protective colloid such as osseine, albumen, glue, gelatin, saponin, bentonite and colloidal earths. A typical concrete mixture of this proposed process is given by the following proportions:

| | | |
|---|---|---|
| Cement | kg | 19.000 |
| Sand | do | 4.500 |
| Limestone | do | 0.500 |
| Calcium chloride | do | 0.600 |
| NaOCl solution | liter | 0.250 |
| NH₃ solution | do | 0.100 |
| H₂O₂ solution | do | 0.150 |
| Osseine solution | do | 0.075 |

These conventional mixtures have the serious disadvantage that they consist of a large number of different materials, most of which must be incorporated in the form of solutions. More particularly, the ammonia has always been used as an ammonia solution or aqua ammonia. Of course, the accurate preparation and admixing of these solutions has caused considerable difficulties in operation under practical and industrial conditions. This difficulty has been further aggravated by the circumstance that in view of the dissolved character of the reacting agents, the gas forming reaction would take place almost instantaneously and often be accompanied by an ill smelling gas irritating to the eyes and nasal passages of the workmen. In other words, not a desirable slow gas formation but a rapid formation of gases and of bubbles takes place during the first few minutes after the mixing, producing large bubbles of gas and an unequal distribution of the voids in the concrete structure.

Although various other suggestions and proposals have also been made to solve the outstanding problem and to provide the art with a simple and completely satisfactory process of producing porous concrete, none of these various suggestions and proposals has, so far as I am aware, been completely satisfactory and successful when carried into practice on a practical and industrial scale.

I have discovered that the problem may be manner.

It is an object of the present invention to provide a process for the production of porous concrete which eliminates the disadvantages and inconveniences of conventional processes.

It is another object of the present invention to provide a novel and improved process for the production of porous concrete structures which involves reacting urea with a suitable material to cause the production of gaseous nitrogen at a slow, predetermined, and readily controlled rate.

It is a further object of the invention to provide a process of producing light-weight porous concrete bodies of high early strength by admixing a dry concrete mix containing cement, sand (or sand and aggregate), granular urea, and solid calcium hypochlorite with suitable quantities of water, said concrete bodies having small gas bubbles or voids uniformly distributed therein.

A further object is to provide a process which develops sufficient heat so that porous concrete may be laid during the winter season.

Another object is to generate calcium chloride in situ in the cement mix, this calcium chloride aiding in producing a high early strength concrete.

The invention also contemplates a lightweight, high-strength porous concrete having a large number of relatively small nitrogen bubbles distributed therein, which may be produced or poured in any desired thickness or depth by a simple, direct, and fool-proof procedure and at a low cost without requiring any special skill or experience.

Other and further objects and advantages of the invention will become apparent from the following description taken in conjunction with the accompanying example.

Broadly stated, according to the principles of my invention, a process for the manufacture of porous concrete is provided involving scattering nitrogen bubbles through the concrete by reacting urea with calcium hypochlorite (bleaching powder) in the presence of a material adapted to decrease the rate of loss of nitrogen gas from the suspension. Preferred forms of urea are the granular forms and particularly the fertilizer grade known as "uramon" containing about 42% nitrogen. Pure urea contains about 46⅔% nitrogen. As the hypochlorite, either straight calcium hypochlorite ($Ca(OCl)_2$) or bleaching powder ($CaOCl_2$) which is a combination of chloride and hypochlorite may be employed, or an alkali hypochlorite, such as, for example, sodium hypochlorite. Although, theoretically, hypobromites may be expected to provide equal or similar results, they are much too expensive to be of practical and industrial importance.

I have also found that in the production of a light-weight, strong, porous concrete it is of critical importance carefully to control the rate of reaction and, more particularly, to slow down the evolution of nitrogen so that a slow gas formation over about a 10 minute period is obtained in contrast with the rapid and almost instantaneous gas evolution of some prior processes. This slowing down is most easily obtained by granulating the urea, using as an adhesive to coat and hold the particles in granular form a material which is only slowly, if at all, soluble in water, e. g., rosin, paraffin, stearic acid, sulfur or slightly soluble gums.

Coating and granulation can be accomplished, for example, by melting rosin and stirring in the rosin is used up in coating the crystals. Even better results may be obtained by dissolving the rosin in the minimum amount of acetone, ordinary alcohol or isopropyl alcohol to give a strong solution, then wetting the crystals with this material, and precipitating the rosin on the crystals by adding gasoline to the mixture. The crystals are then filtered off and dried and the filtrate is worked up in the customary manner to recover its constituents for reuse in the process.

Essentially, the same results may be obtained by the addition of materials capable of stabilizing the bubbles produced by the evolved nitrogen and of preventing their quick escape or their combination to form large bubbles or blisters. This can be obtained by small additions of soap bark or of powdered licorice root. Cost considered, the licorice root is the cheapest material to use. Although these materials are known to be capable of reducing the surface tension, it is not this property, but their ability to stabilize bubbles which is of decisive influence. Thus, for example, using approximately the same amounts, licorice root gave a surface tension of 70 dynes, soap bark 52 dynes, "Tergitol" 55 dynes, and "Igepon" 39 dynes. I have found that the last two materials are practically useless in the cement mixtures contemplated by the present invention whereas licorice root and soap bark provide excellent results. In other words, the lowering of surface tension is not a measurement of usefulness, but the foam producing ability is, even though these two qualities are generally considered by physical chemists to be closely correlated.

The process in general consists in adding to the cement mixture with sand or cinders or grit or gravel or other aggregate, a preferred amount of the urea and the material for retarding the evolution of gas, and thereafter the water and the hypochlorite are added. Although I prefer to add the hypochlorite after the urea, as disclosed here, the reverse order may be used with satisfactory results. The whole mixture is mixed in a conventional cement mixer and is poured into the forms in the conventional manner.

The resultant product is a porous concrete of a density lower than that which would have resulted if my active agents had not been added, for it is possible by my process to make a porous concrete which will weigh less than about 50 lb. per cu. ft., as well as a porous concrete weighing about 120 lb. per cu. ft., by varying the proportions of the mix, the type of aggregate used, and the amount of active agents introduced therein.

In order that those skilled in the art may have a better understanding of the invention, the following illustrative example is given:

*Example*

About 4.5 bags of cement, each bag corresponding to about 1 cubic foot or 94 lb. are mixed with about 17.5 cubic feet of sand. About 13 lb. of about 35% bleaching powder with about ½ lb. of ground licorice root are added to the cement and sand mixture. These materials are now mixed with the necessary amount of water in a conventional cement mixer, about 2.5 lb. of granular urea carrying approximately 42% nitrogen is added and, after mixing, the mixture is poured into the mold or formed in the conventional manner. About one cubic yard of porous concrete is obtained, having a density of about 0.6 of that which would have resulted if my active agents had not been added. If only half as much sand is used the density will be somewhat less, e. g., about 0.5 of ordinary dense concrete.

With less urea and less hypochlorite, other densities of concrete can be made, and variations in strength of two different mixes of the product having the same density can be effected. The porous concrete (having a ratio, say, of 1:4) provided in accordance with the principles of the present invention will have good crushing strength.

In the example just given, the temperature rise was about 50° F., i. e., more than double the ordinary temperature rise. This higher temperature rise brings about faster setting of the concrete and also permits concrete to be laid in colder weather than would otherwise be the case. Conventional dense concrete weighs approximately 140 pounds per cubic foot, whereas, my novel porous concrete weighs from about 45 to about 120 pounds per cubic foot, depending upon the composition of the aggregate and the amounts of active agents used. Thus, the porous concrete embodying the present invention provides a very light concrete structure having a substantial strength unobtainable heretofore with conventional porous concrete structures.

The process embodying the present invention provides a porous concrete which is not only of high strength but is also quick setting. The strength and the quick-setting qualities of my porous concrete are greatly improved by the presence of calcium chloride which is a by-product of the reaction of the urea with the bleaching powder.

By adding certain fibrous materials, such as asbestos fibers or wood fibers to the cement-sand mixture including the gas-forming constituents described in the foregoing, porous concrete blocks, slabs or boards may be produced. These porous bodies can be sawn and worked with conventional tools, are light and strong and have excellent heat-insulating properties.

Although the present invention has been described in connection with a preferred embodiment thereof, variations and modifications may be resorted to by those skilled in the art without departing from the principles of the present invention. I consider all of these variations and modifications as within the true spirit and scope of the present invention as disclosed in the foregoing description and defined in the appended claims.

I claim:

1. The process of producing light-weight, high early strength porous concrete which comprises reacting in a cement mix urea with a hypochlorite.

2. The process of producing light-weight, high early strength porous concrete which comprises reacting in a cement mix urea with a hypochlorite in the presence of a material adapted to slow down the liberation of gas produced by the reaction to cause the production of fine bubbles of nitrogen-containing gas throughout said mix.

3. The process of producing light-weight porous concrete which comprises reacting urea with a hypochlorite in a cement slurry to cause the production of nitrogen-containing bubbles in said slurry, controlling the speed of such reaction to decrease the rate of loss of nitrogen-containing gas from said slurry, and allowing said slurry to set and to harden to obtain a light-weight porous concrete of good strength.

4. The process of producing light-weight porous concrete which comprises reacting in a slurry of cement and sand urea with a hypochlorite selected from the group consisting of calcium hypochlorite, bleaching powder, and sodium hypochlorite.

5. The process of producing light-weight high-strength porous concrete which comprises reacting in a cement slurry urea with a hypochlorite selected from the group consisting of calcium hypochlorite, bleaching powder, and sodium hypochlorite in the presence of a material adapted to decrease the rate of loss of nitrogen-containing gas from said slurry, and allowing said slurry to set and to harden to obtain a light-weight porous concrete of good strength.

6. The process of producing light-weight porous concrete which comprises reacting in a slurry of cement and sand urea with a hypochlorite selected from the group consisting of calcium hypochlorite, bleaching powder, and sodium hypochlorite in the presence of materials adapted to retard the loss of nitrogen-containing gas produced by said reaction, said materials being selected from the group consisting of soap bark and powdered licorice root, and allowing said slurry to set and to harden to obtain a light-weight porous concrete of good strength.

7. The process of producing light-weight porous concrete which comprises reacting in a slurry of cement and aggregate urea with a hypochlorite to cause the production of finely distributed nitrogen-containing bubbles in said slurry, said urea having crystals coated with a material selected from the group consisting of rosin, slightly soluble gums, elemental sulfur, paraffin and stearic acid to slow down the production of nitrogen-containing gas, and subsequently allowing said slurry to set and to harden to obtain a light-weight concrete of good strength.

8. The process of producing light-weight porous concrete which comprises reacting urea with bleaching powder in the presence of ground licorice root in a slurry of cement and aggregate to cause the production of finely distributed nitrogen-containing bubbles at a relatively slow and controlled rate, and allowing said slurry to set and to harden to obtain a light-weight porous concrete of good strength.

9. The process of producing light-weight porous concrete which comprises reacting about 2.5 parts by weight of granular urea carrying approximately 42% nitrogen with about 13 parts by weight of 35% bleaching powder in a slurry of aggregate and about 94 parts of cement in the presence of about ½ part by weight of ground licorice root to cause the production of finely distributed nitrogen-containing bubbles at a relatively slow and controlled rate, and allowing said slurry to set and to harden to obtain light-weight porous concrete of good strength.

10. The process of producing light-weight porous concrete which comprises admixing urea and a material adapted to retard the evolution of gas therefrom to a cement and aggregate mixture, adding water and hypochlorite to such mixture to cause the evolution of nitrogen-containing bubbles at a slow and controlled rate, thoroughly mixing the resulting slurry for a period not exceeding fifteen minutes, including the pouring of the slurry thus treated into molds, and allowing said slurry to set and to harden in said molds to obtain a light-weight porous concrete of good strength.

rous concrete which comprises admixing urea in a cement and aggregate mixture, said urea having crystals coated with a thin layer of a slightly water soluble material, adding hypochlorite and water to said mixture to cause the evolution of nitrogen-containing bubbles at a slow and con- slurry for a period not exceeding fifteen minutes, pouring the slurry thus treated into molds, and allowing said slurry to set and to harden in said molds to obtain a light-weight porous concrete of good strength.

RALPH H. McKEE.